United States Patent
Koehler

(10) Patent No.: US 8,844,413 B2
(45) Date of Patent: Sep. 30, 2014

(54) METHOD OF MAKING A DIE-CUT FOAM OBJECT

(75) Inventor: Peter Koehler, Freudenberg (DE)

(73) Assignee: Koehler & Krafft GmbH & Co. KG, Freudenberg (DE)

(*) Notice: Subject to any disclaimer, the term of this patent is extended or adjusted under 35 U.S.C. 154(b) by 967 days.

(21) Appl. No.: 12/597,191

(22) PCT Filed: Apr. 28, 2008

(86) PCT No.: PCT/EP2008/003415
§ 371 (c)(1),
(2), (4) Date: Oct. 31, 2009

(87) PCT Pub. No.: WO2008/135191
PCT Pub. Date: Nov. 13, 2008

(65) Prior Publication Data
US 2011/0250399 A1    Oct. 13, 2011

(30) Foreign Application Priority Data

May 2, 2007   (DE) .......................... 10 2007 020 850
Jul. 21, 2007  (DE) .......................... 10 2007 034 136

(51) Int. Cl.
*B26D 3/28*    (2006.01)
(52) U.S. Cl.
USPC .................................................. 83/19; 83/39
(58) Field of Classification Search
USPC ........................................................ 83/19, 39
IPC ........................................................ B26D 3/281
See application file for complete search history.

(56) References Cited

U.S. PATENT DOCUMENTS

| | | | | |
|---|---|---|---|---|
| 1,145,654 A | * | 7/1915 | Anderson | 128/894 |
| 3,154,607 A | * | 10/1964 | Struthers | 264/54 |
| 3,186,271 A | | 6/1965 | Kaiser | 83/4 |
| 3,665,792 A | | 5/1972 | Bush et al. | 83/1 |
| 4,240,240 A | | 12/1980 | Cohen | 53/410 |
| 4,924,540 A | * | 5/1990 | Main | 5/636 |
| D339,020 S | * | 9/1993 | Ward et al. | D6/601 |
| 5,523,040 A | * | 6/1996 | Krouskop | 264/163 |
| 2004/0066568 A1 | | 4/2004 | Bauer | |

FOREIGN PATENT DOCUMENTS

| | | |
|---|---|---|
| DE | 1709739 | 10/1955 |
| DE | 1758789 | 12/1957 |
| DE | 1891607 | 4/1964 |
| DE | 3522192 | 1/1987 |
| FR | 1.012.897 | * 7/1952 |
| FR | 2674183 | 9/1992 |
| JP | 3137324 A | 11/1991 |

* cited by examiner

Primary Examiner — Kenneth E. Peterson
(74) Attorney, Agent, or Firm — Andrew Wilford

(57) ABSTRACT

The invention relates to a method for producing a form-cut object made of foam. The invention is based on the aim of refining a known method for producing a form-cut object made of foam in that it also allows the precise creation of complex shaped form cuts in the foam. This aim is achieved by the method according to the invention in that the first preliminary version of the object in the region of a first form or contour cut is provided with a (second) form cut, which is superimposed on the first form or contour cut and extends down to larger depths than the first cut. Preferred application areas of the claimed method and the resultant objects made of foam are pillows, for example.

4 Claims, 1 Drawing Sheet

METHOD OF MAKING A DIE-CUT FOAM OBJECT

CROSS REFERENCE TO RELATED APPLICATIONS

This application is the US-national stage of PCT application PCT/EP2008/003415, filed 28 Apr. 2008, published 13 Nov. 2008 as WO2008/135191, and claiming the priority of German patent application 102007020850.4 itself filed 2 May 2007 and German patent application 102007034136.0 itself filed 21 Jul. 2007.

FIELD OF THE INVENTION

The invention relates to a method of making a die-cut object from foam, for example a pillow, mattress, or a molded receptacle for cameras, measuring instruments, or other products sensitive to impact.

BACKGROUND OF THE INVENTION

A die is known from DE 1,758,789 for producing curved is surfaces on objects made of porous, elastic materials such as foam, foam rubber, and the like. The die has or is a plunger that is provided with cutouts for the curved surfaces to be produced, and the parts of the material that are not being compressed by the die bulge out into these cutouts and are cut off, whereupon after the pressure is relieved the cut edges form the desired curved surfaces.

A device is known from DE 1,891,607 for mechanically cutting out symmetrical and asymmetrical three-dimensional bodies made of synthetic foam plates and similar materials, in which a band saw cuts the pressed foam into a shape. A cylindrical press roller that presses the workpiece into a flat shape is provided that is transported in a straight line on a work platform just below the roller die at a speed that is equal to the circumferential speed of the roller. Downstream from the roller a blade rotating transversely with respect to the transport direction of the die is provided that cuts the foam approximately in the center plane thereof, and an adjuster is provided for setting the distance between the upper edge of the die and the lower edge of the roller, and also the height of the blade.

A press die is known from DE 1,709,739 for forming bodies from porous substances such as foam rubber, sponge rubber, synthetic foam, or the like, having a concave lower surface and a flat top surface. The die, which has a box or tubular shape, for example, has a base at the bottom with an opening whose outer edge has the shape of the largest circumference of the cavity that is intended to receive the body to be shaped. A disk that is fitted into the die parallel to the base and that can be moved inward is used as a pressure ram, so that the material to be pressed is pressed between the ram and the base, and a section of the pressed material that bulges out from the cover opening can be cut off using a blade guided on the surface of the base.

A method is known from DE 3,522,192 for making a body composed of a blank made of foam, rigid foam, or the like by using a hot wire or thermal cutting device or the like. Several imaginary planes through the blank are provided. Defined points at each tangent to a plane are connected, on or outside the blank, to corresponding defined points at the corresponding tangent to the adjacent plane, on or outside the blank, by use of flexible, heat-resistant connections, and the cutting element is guided along these connections.

The cutting of contours in foam is known. It is also known to make die cuts in foams using an extrusion or die cutting machine. To this end, in one work step a section of a foam blank originally in the shape of a block, for example, is pressed into a first negative die, also referred to as a first die. The section of the foam pressed into the negative die is then cut off using an oscillating or rotating blade, for example. After further transport the foam re-expands, at which point at least one first die cut corresponding to the first negative die is made in the foam. The negative die may be made of wood or aluminum, for example.

A disadvantage of this procedure is that it is not suitable for making complex die cuts, i.e. sharply angled cutouts, for example, in the foam at great or different depths. The cut is rough at the edges and the surfaces are not smooth.

OBJECT OF THE INVENTION

Based on this prior art, the object of the invention is to refine a known method of making a die- or contour-cut object from foam so as to also allow the precise creation of complex shaped die cuts in the foam.

SUMMARY OF THE INVENTION

Within the scope of the present invention, the term "die cut" also refers to cutouts or any given profiles or contours imparted to the foam. A negative die is also referred to as a die.

The invention provides that after a first die or contour cut as a first work step the foam is subjected to at least one second work step. In the second work step a section of the foam remaining after the first work step is pressed into a negative die, i.e. a die, using a die cutting machine. If a die cutting machine has also been used in the first work step, the first and the second negative dies are preferably different.

In order to achieve good pressure distribution at the bottom as well as at the sides in the region of the first die or contour cut while the foam is pressed into the negative die used in the second work step, the pressing is preferably carried out using a plunger, which as a positive die at least approximately corresponds to the first section of the foam blank cut off by the die or contour cut. This ensures that during the second work step the foam is also pressed in at narrow or angled regions of the negative die.

The plunger may be made of the same material as the machined foam, or of some other material such as wood, aluminum, or a higher-density foam, for example.

During the second work step the plunger is placed between the press roller and the foam, preferably in the region of the first die or contour cut, with its positive contour on the foam. The section of the foam that is thus pressed into the negative die is then cut off along a cut line, resulting in a die cut in the same foam. The die or contour cut produced during the second work step is superimposed on the first die cut, and extends more deeply into the foam than the first cut.

In general, the method according to the invention, by means of n repetitions of the described work steps, preferably using differently shaped dies in each case, allows any given number and shape of cuts to be superimposed for the same piece of foam. By use of this stepwise machining, a complex shape of an overall die cut, having sharp contours/borders/edges and smooth surfaces, may ultimately be introduced into the foam, also at considerable depths.

The method according to the invention is suitable for foams having different density and surface characteristics, for example for viscoelastic foams, polyether foams, or latex foams.

BRIEF DESCRIPTION OF THE DRAWING

The method according to the invention described in general above is explained below with reference to the accompanying figures, wherein.

DETAILED DESCRIPTION OF THE INVENTION

Figure 1:
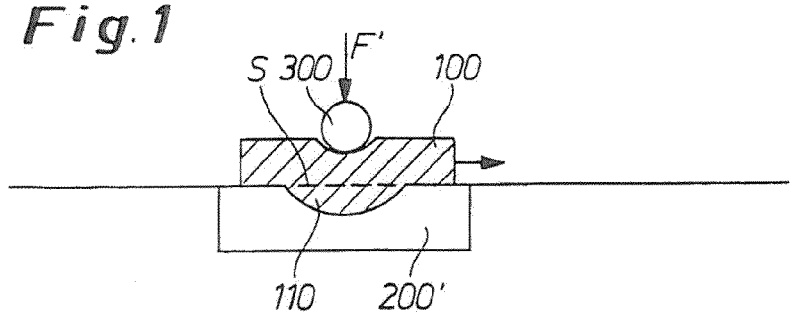
FIG. 1 shows a first work step according to the invention.

FIGS. 1-5 show the production of a pillow as an example of a die-cut object. Identical technical elements are denoted by the same reference numerals in all the figures.

FIG. 1 illustrates a first work step in which a first section 110 of a foam blank 100 originally having a parallele-pipedal shape is pressed into a first negative die 200'. The pressing is performed with a force F' by means of a roller 300. The force F' and the resulting pressure are individually adjusted. The section 110 of the foam pressed into the negative die is cut off along cut line S.

Figure 2:
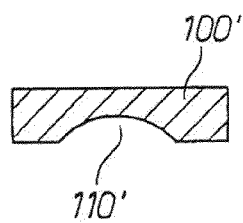
FIG. 2 shows the first preliminary version of the die- or contour-cut foam object resulting from the first work step.

After relaxation, the first die cut made in the foam forms a first cutout 110' as shown in FIG. 2. The relaxed foam then constitutes a first preliminary version 100' of the final end product of the die-cut object.

Figure 3:
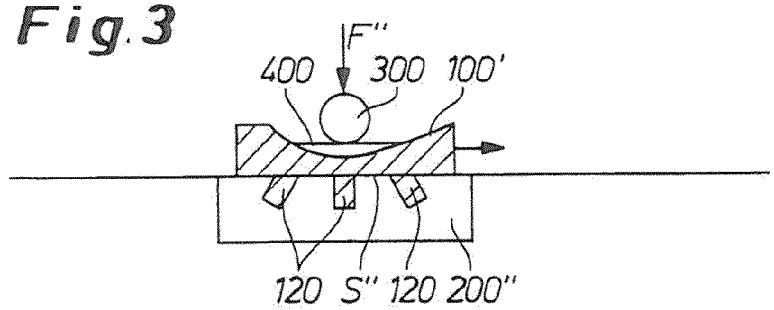
FIG. 3 shows a second work step.

FIG. 3 shows a second work step in which second sections 120 of the foam from the first preliminary version 100' of the object 100' are pressed into a second negative die 200". The pressing is performed with a force F". In order to achieve good pressure distribution at the bottom as well as at the sides, in particular in the region of the first die or contour cut, while the foam is pressed into the negative die 200", the pressing is preferably carried out using a plunger 400, which as a positive die at least approximately corresponds to the cutout 110'. The foam pressed into the second negative die is then cut off along cut line S".

Figure 4:
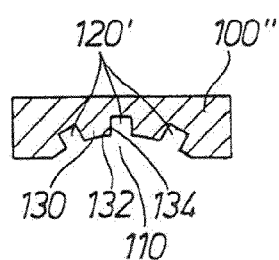
FIG. 4 shows the die-cut object after the second work step.

In the second work step, in the region of the first cutout 110', second die cutouts or indentations 120' are made in the pillow surface as shown in FIG. 4. This results in ridges 130 between the indentations, each having an outer face 132 and side flanks 134. The flanks may extend in at an angle or perpendicular, thereby making the ridges 130 trapezoidal or rectangular.

FIG. 4 shows the results of the second work step; in the present case the finished die-cut pillow is upside down. In other cases additional work steps may be performed to make further die cuts in the pillow, each of which are superimposed on the respectively previous die cuts and extend progressively deeper into the foam.

Figure 5:
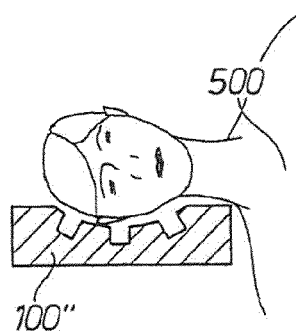
FIG. 5 shows a use of the die-cut object.

FIG. 5 shows one use of the pillow that is die-cut according to the invention, in which a person 500 rests his head on the pillow 100". The first cutout 110' in the pillow provides an optimal seat for the curved head of the person. In addition, the second cutouts 120' provide improved ventilation in the head region, resulting in less perspiration by the person when resting on the pillow.

The invention claimed is:

1. A method of making a die-cut object from a foam blank, the method comprising the steps of sequentially:

pressing a front face of the blank against a first negative die having a first cavity such that a first section of the front face of the blank enters into and assumes the shape of the first cavity of the first negative die;

while the blank is pressed against the first negative die, cutting off the first section such that when the blank is removed from the first negative die it has on the front face a first cutout shaped like the first cavity;

engaging the front face formed with the first cutout of the blank against a second negative die having second cavities and differently shaped from the first die with the first cutout open toward the second cavities;

engaging against an opposite back face of the blank in alignment with the first cutout a positive die made of the same foam as the blank or a harder foam and of a shape corresponding generally to the first cutout;

pressing the positive die with a roller against the back face such that second sections of the blank in the first cutout enter into and assume the shapes of the second cavities of the second negative die; and while the blank is pressed by the positive die against the second negative die, cutting off the second sections such that when the blank is removed from the second negative die it has in the first cutout second cutouts shaped like the second cavities and forming ridges having outer faces and side flanks and indentations between the ridges.

2. The method according to claim 1, wherein the pressing of the foam blank into one of the negative dies is performed with a pressure that is individually adjusted as a function of the particular foam material used or a depth of the die cavity or contour cuts previously made in the foam.

3. The method defined in claim 1, wherein the second-die cavities are deeper than the first-die cavity so that the first cutout is shallower than the second cutouts.

4. The method defined in claim 1, wherein the blank and the positive die are a viscoelastic foam, a polyether foam, or a latex foam.

* * * * *